United States Patent [19]

Mutton et al.

[11] E Re. 31,238

[45] Reissued May 10, 1983

[54] ELECTROGRAPHIC COPIER WITH ONE-PIECE BELT AND STYLI

[75] Inventors: Jon C. Mutton, Portland; Peter J. Unger, Beaverton, both of Oreg.

[73] Assignee: Tektronix, Inc., Beaverton, Oreg.

[21] Appl. No.: 93,571

[22] Filed: Nov. 13, 1979

Related U.S. Patent Documents

Reissue of:

[64] Patent No.: 4,148,042
Issued: Apr. 3, 1979
Appl. No.: 850,529
Filed: Nov. 11, 1977

[51] Int. Cl.[3] ..... G03G 15/02; G03G 15/00

[52] U.S. Cl. ..... 346/155; 346/139 A; 346/139 L

[58] Field of Search ..... 346/155, 162, 163, 165, 346/139 A, 139 B, 139 C; 340/675; 250/559, 571

[56] References Cited

U.S. PATENT DOCUMENTS

| | | | |
|---|---|---|---|
| 2,312,317 | 3/1943 | Burcky | 346/139 A |
| 2,643,932 | 6/1953 | Musante | 346/139 A |
| 2,743,989 | 5/1956 | Clurman | 346/139 A |
| 3,050,580 | 8/1962 | Schwertz | 358/300 |
| 3,369,250 | 2/1968 | Gifft | 346/139 A |
| 3,757,352 | 9/1973 | Murray | 346/139 A |
| 3,769,628 | 10/1973 | Kenny | 346/154 |
| 3,787,878 | 1/1974 | Kampf | 346/139 B |
| 3,792,495 | 2/1974 | Bliss | 346/154 |
| 3,816,840 | 6/1974 | Kotz | 346/150 |

FOREIGN PATENT DOCUMENTS

| | | | |
|---|---|---|---|
| 289857 | 10/1931 | Italy | 346/139 C |

OTHER PUBLICATIONS

IBM Technical Discl. Bull., vol. 15, No. 3, p. 775, "Printed Circuit Writing Head for Electrochemical Printer," by Barrington et al.

*Primary Examiner*—Alan Faber
*Attorney, Agent, or Firm*—Thomas J. Spence; John H. Bouchard

[57] ABSTRACT

Electrographic paper is fed over a segmented platen where its dielectric surface receives image defining electrostatic charges deposited by styli bearing directly and successively upon it. The styli are integral to an endless belt moving laterally to the surface. Voltage pulses corresponding to the input information are applied to the segmented platen to produce the electrostatic charges. The latent image charged surface is progressively fed to an image toning and fixing cycle to produce a hard copy.

17 Claims, 4 Drawing Figures

ELECTROGRAPHIC COPIER WITH ONE-PIECE BELT AND STYLI

Matter enclosed in heavy brackets [ ] appears in the original patent but forms no part of this reissue specification; matter printed in italics indicates the additions made by reissue.

BACKGROUND OF THE INVENTION

The subject invention relates generally to recorders for producing a hard copy of data supplied in electrical line format and more particularly to apparatus for electrographic recording or printing graphical information or other alphanumerical data.

The electro recording apparatus and processes of the prior art is generally characterized by (1) electrically charging areas on selected portions of a recording medium, (2) developing the charged areas on the recording medium, and (3) fixing the developed areas on the recording medium, as by pressure and/or heat, to render the recorded information permanent on the medium. The subject invention is directed to improving the first of the above characterized portions, namely the electrically charging of the areas on the recording medium.

Various techniques and apparatus have been arrived at for producing a hard copy of data supplied in electrical line format wherein electrostatic charges on the recording format are established. U.S. Pat. No. 3,757,352 to Murray et al exemplifies a system wherein a conductive paper web with a dielectric coating is fed over a writing roll where its surface receives image defining electrostatic charges deposited by one of three pulsed line scan styli bearing directly and successively upon it, the styli being removably secured to an endless belt moving at a constant velocity laterally of the web. Another example is the teachings of U.S. Pat. No. 3,050,580 to Schwertz or U.S. Pat. No. 2,743,989 to Clurman et al, the former having plural fixed point electrodes arranged in a transverse row across a web upon which [an] image defining electrostatic charges are deposited and the latter which has plural electrodes mounted serially on an endless belt moving laterally of the web. Such prior art is, however, relatively complex and expensive, and have generally suffered, in varying degrees, from a number of drawbacks due to environmental conditions, dependency on critical tolerances, etc. to list but a few. Other drawbacks are the problems of synchronization required of copiers where copy quality is most desirable.

Another disadvantage of these prior art copiers which utilize endless belts is that pulleys utilized to carry and drive these endless or continuous belts are usually crowned so that at operating speeds the crowns alone are sufficient to hold the belt in proper position. Additionally, these copiers generally utilize magnetic retaining means to prevent flutter of the stylus assemblies as it traverses around the pulleys. Crowning of the pulleys however, causes the belts to become different in form after periods of use whereas the magnetic retaining means add complexity, hence cost, to the copiers.

SUMMARY OF THE INVENTION

Briefly stated, the present invention provides an electrographic copier wherein electrographic paper is fed over a segmented platen where its dielectric surface receives image defining electrostatic charges deposited by styli bearing directly and successively upon it. The styli are integral to an endless belt moving laterally to the surface. Voltage pulses corresponding to the input information [area] *are* applied to the segmented platen to produce the electrostatic charges. The latent image charged surface is progressively fed to an image toning and fixing cycle to produce a hard copy.

Since the movement of the styli provides a "mechanical scan", an image can be defined anywhere along the line traversed, and a copy of superior quality is produced thereby overcoming some of the prior art disadvantages; resolution may be increased by controlling pulse rate and surface velocity. Additionally, as the styli are integral to an endless belt, such belt is relatively inexpensive to fabricate. Also, since more than one stylus is simultaneously recording, the recording speed is increased. The position of the styli with the belt are easily maintained in that rather than crowning the drive pulleys and/or utilizing a complex alignment means, the present invention utilizes a simple mechanical sled arrangement which steers one of the pulleys to thereby maintain or hold the belt in proper position and to prevent flutter of the styli.

It is therefore an object of the present invention to provide an improved electro recording apparatus to overcome the disadvantages of the prior art.

It is another object of the present invention to provide an improved electro recording apparatus which is relatively inexpensive and non-complex.

It is yet another object of the present invention to provide an improved electro recording apparatus employing an endless belt having integral [stylus] *styli* and a segmented platen for producing [an] image defining electrostatic charges deposited on a sensitized surface therebetween.

The foregoing and numerous other objects, advantages, and inherent functions of the present invention will become apparent as the same is more fully understood from the following description and drawings which describes the invention in one of its preferred embodiments; it is to be understood, however, that the embodiment described is not intending to be limiting nor exhausting of the invention but is given for the purpose of illustration in order that others skilled in the art may fully understand the invention and principles thereof and the manner of applying it in practical use so that they may modify it in various forms, each as may be best suited to the conditions of the particular use.

DESCRIPTION OF DRAWINGS

In the drawings, wherein like numerals refer to like elements.

DESCRIPTION OF THE INVENTION

Figure 1:
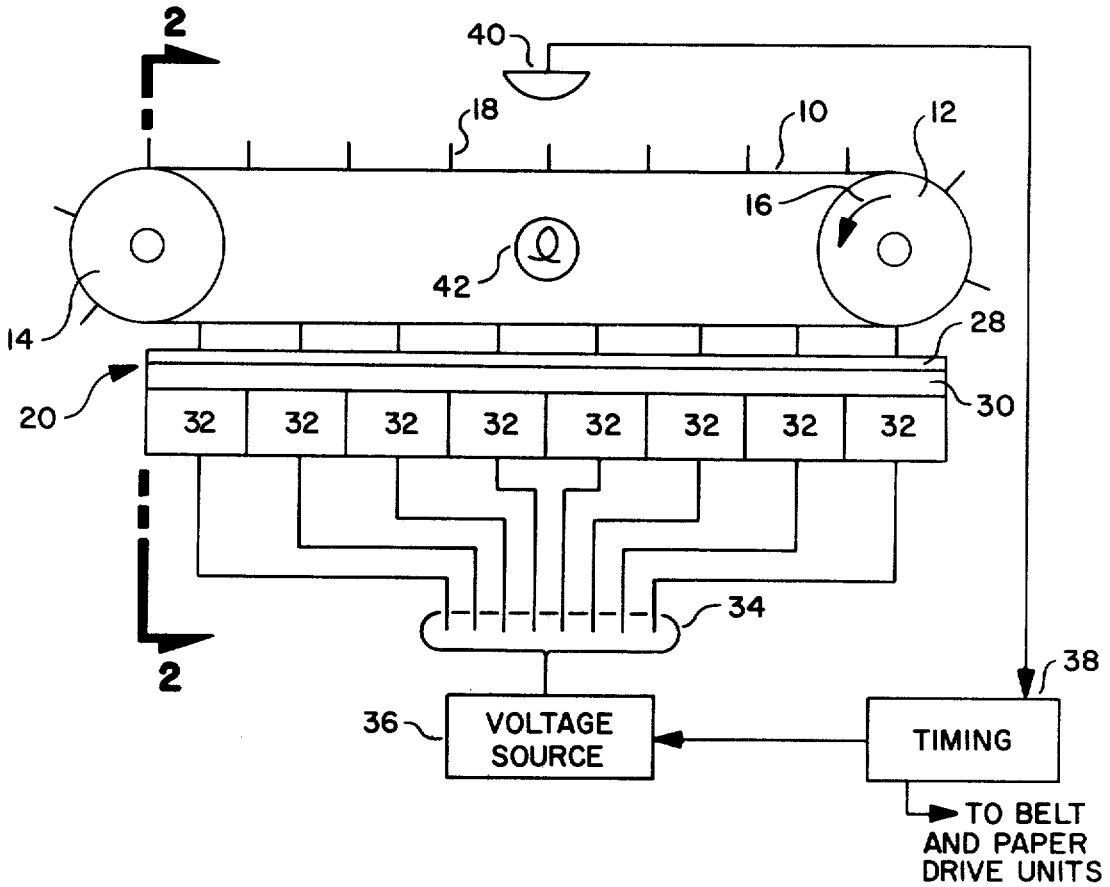
FIG. 1 represents a diagrammatic view of the copier embodying the invention.
Figure 2:
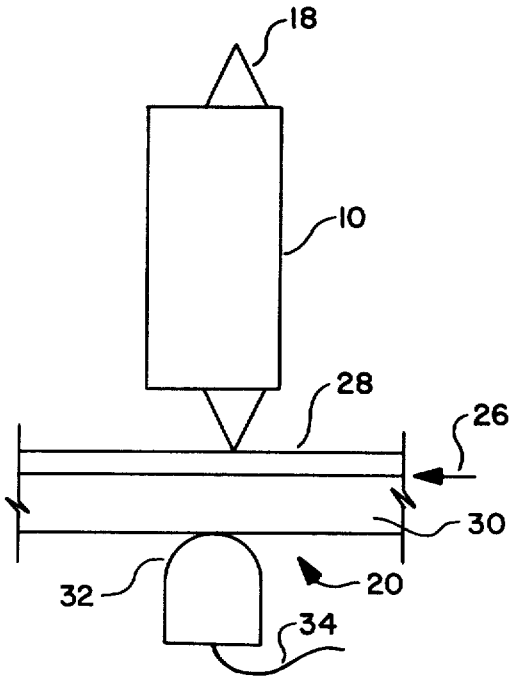
FIG. 2 is a side diagrammatic view of the copier according to FIG. 1 taken along the line 2—2 thereof.
Figure 3:
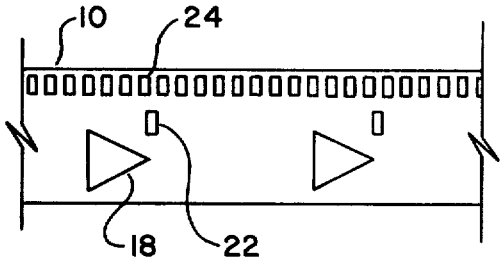
FIG. 3 is a partial view of the conductive belt in accordance with FIGS. 1 and 2.

One embodiment of the electrographic copier in accordance with the present invention is shown in FIGS. 1, 2, and 3 and includes an endless conductive belt 10 preferrably made of material such as "303" full hard temper stainless steel having a thickness of about 0.001-inch and a width of about 0.500-inch running over rotatable pulleys 12 and 14, the former of which is driven in the direction of arcuate arrow 16 by conventional means (not shown) such as a driven axle. A plurality of marking styli 18, in the form of projecting pins and formed from selectively spaced and bent-out segments of the belt, make contact with and travel across a strip of paper 20 during a part of their path around the rotating pulleys. Each [styli] *stylus* has its contact end [electroplated with material or deposited] *coated with* hard material such as chromium or other hard material attached. Belt 10 is also provided with a plurality of first timing marks or tracks 22, there being one timing mark per [styli] *stylus*. Each timing mark 22 is located adjacent *the* tip or contact end of the styli 18 to exactly locate the position thereof. Each timing mark is also formed from selectively spaced and removed sections of belt 10. In addition to timing marks 22, a second [tract] *track* of timing marks 24 are provided within belt 10. As can be discerned from the drawings, there are several timing marks 24 for each timing mark 22 thereby [enablying] *enabling* precise timing of the belt and paper relative to each other. Alternatively, timing marks 24 may be located on the conventional means discussed for driving the pulley 12 to thereby control or reduce slip between belt 10 and pulley 12.

Paper 20, in turn, is simultaneously driven by other conventional means (not shown) so that its movement is at approximately right angles to the direction of travel of the styli i.e., in the direction of arrow 26, thereby producing a pattern of closely spaced lines of contact on the paper. This pattern of closely spaced lines, or resolution, is of course, controlled by the speed of relative movement between the styli and paper. As a typical example, driving 4-inch circumference pulleys at 3600 revolutions per minute to move belt 10 at a speed of 240 inches per second and moving paper 20 at a speed of 1.2 inches per second provides a resolution of 200 lines per inch which produces a good appearing copy. Paper 20 is desired to be somewhat conductive and is preferably coated with a layer 28 of suitable insulator (dielectric). A paper with these mentioned characteristics is electrographic paper A2504 manufactured by Crown Zellerbach. The back 30 of paper 20, which is the somewhat conductive portion, is held in contact with conventional voltage controlled backing electrodes 32 which each receive voltage pulses via lines 34 from a voltage source 36 under the control of a timing stage 38. These voltage pulses are therefore applied between the styli and the backing electrodes with controlled timing to produce an electrostatic charge pattern on the insulative coating. In addition, timing stage 38 receives from a light collector means 40 a plurality of belt timing signals for use therewith in providing the control to voltage source 36 as well as providing the control to the belt and paper drive means (not shown). These timing signals are proportional to an amount of light received by the means 40 as such light passes through the [aperatures] *apertures* defining the timing marks 22 and 24. This light is provided by a light source 42 so arranged that the light emitted thereby will be funneled through the [aperatures] *apertures* and blocked otherwise. While a lamp and phototransistor are shown, it is possible that light be provided by, for example, light emitting diode (LED's) and collected by other means such as charge coupled devices (CCD's).

The electrostatically produced charge pattern on the insulative coating of paper 20 according to the invention is next converted into a visual image by the application of a toner which is then fixed in a conventional manner such [as in U.S. Pat. No. 3,757,352 wherein] *as is disclosed in U.S. Pat. No. 3,757,352 wherein it* is described that triboelectrically charged, pigmented, plastic powder or toner which has been previously charged oppositely to the charge on the dielectric surface is applied selectively to the coating. The charge upon the toner is produced by mixing it intimately with another material referred to as a carrier, for example spherical iron filings. This carrier when properly selected is not attracted to the electrostatic charge pattern during the application of the toner to the charged surface of the paper. Fixing of the visual image corresponding to the charge pattern is accomplished by heating the toner to the melting point of the plastic component which, upon cooling, solidifies and causes the toner to adhere to the dielectric surface. As the conversion of the charge pattern into a visual image is conventional and forms no part of the inventive feature, no further discussion or description thereof is believed necessary.

Figure 4:
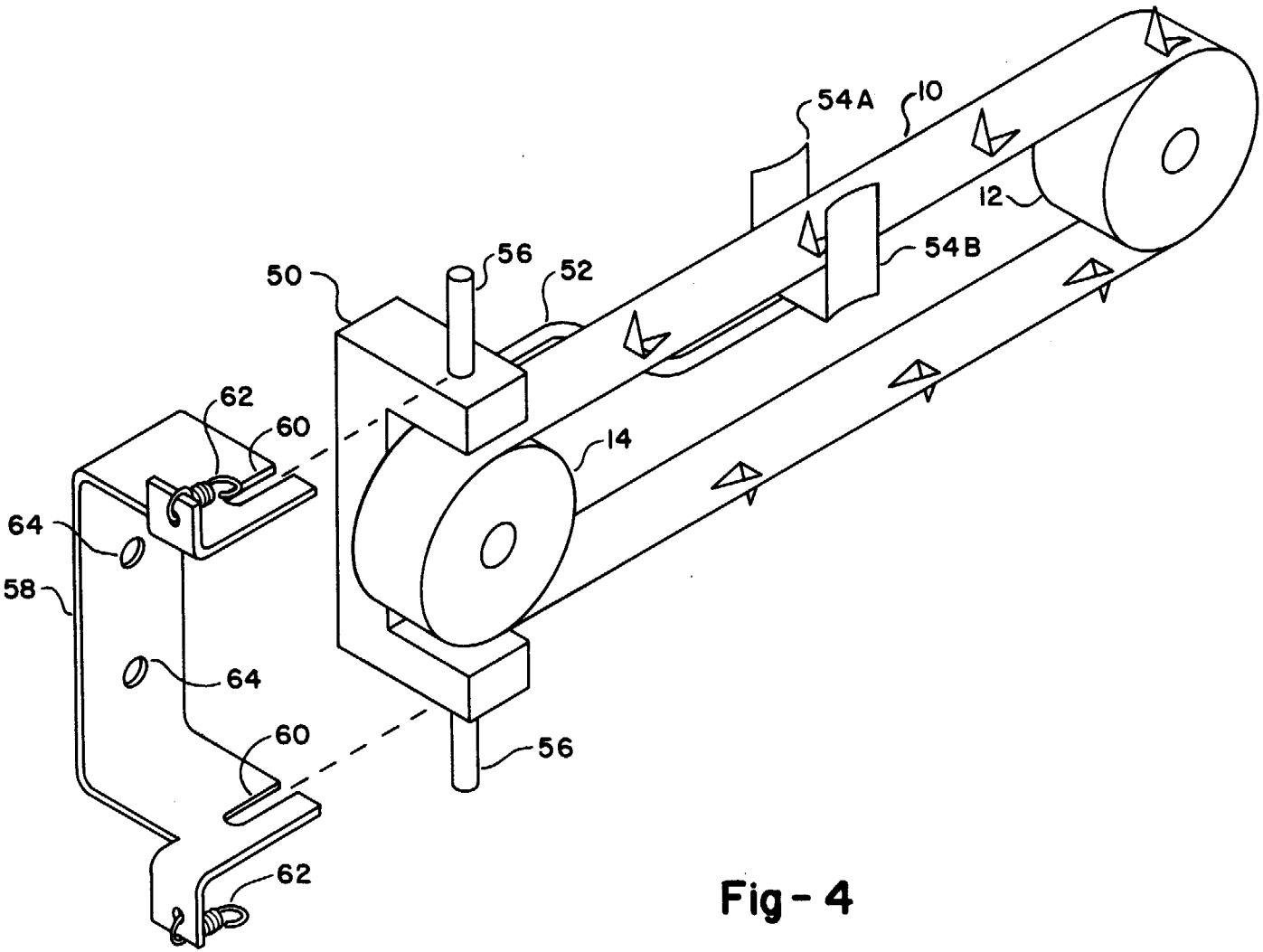
FIG. 4 represents a diagrammatic view of the copier in FIGS. 1, 2 and 3 including a belt tracking device therefor.

Attention is next directed to FIG. 4 wherein is shown the belt tracking device to control the location of the endless belt 10 running on the rotatable pulleys 12 and 14. (For convenience, no timing marks are shown on belt 10.) This belt tracking device causes the endless belt 10 to stay reliably and accurately in a desired position without wandering laterally, axially as referenced to the pulleys. In this embodiment, rotatable pulley 14, which is the non-driven pulley, is mounted in bearings (not shown) in a trunnion 50. Removably secured to the trunnion 50 is a lever 52 whose other end has two shoes 54A and 54B. Endless belt 10 travels between the two shoes, touching both of them. Of course, shoes 54A and 54B have belt contact surfaces which are convex.

Trunnion 50 is provided with pivotal posts 56 so that it can be mounted to rotate laterally within a girdle 58. In the preferred embodiment, pivotal posts 56 or axles, coincides with the center of pulley 14. Girdle 58 is provided with slots 60 into which the axles are disposed, and removably spring loaded by springs 62 which provide proper belt tension. Girdle 58 is, of course, provided with means such as the holes 64 for mounting the girdle to the [chasis] *chassis* of the copier in a conventional manner such as screws, not shown.

Basically, a flat belt running on flat (cylindrical) pulleys whose [axies] *axes* are convergent will move laterally, in the direction of convergence. This phenomenon is exploited by controlling the alignment on the trunnion mounted pulley, using the belt as a reference. The belt travels between the shoes 54A and 54B, and since the belt touches these shoes, any lateral excursion as the belt moves the lever, which rotates the trunnion in the proper direction, to cause the belt to be returned to its original position.

While there has been shown and described the preferred embodiment of the present invention, it will be apparent to those skilled in the art that many modifications may be made thereon for the use thereof. For example, a helical conductor spinning on its center axis can be brought into contact with paper that has an insulative coating; the paper being stretched over a small radius electrode arranged parallel to the axis of the helix. The helix may have a number of turns and the backing electrode a corresponding number of segments to reduce helix speed requirements. The paper would be advanced over the backing electrode as the helix spins so that moving points of contact form a pattern of closely spaced lines. Voltage pulses would be applied between the helix and the electrode segments with controlled timing to produce the electrostatic charge on the insulative coating. Therefore, the appended claims are intended to cover all changes and modifications that fall within the true spirit and scope of the invention.

The invention is claimed in accordance with the following:

1. An electrographic copier, comprising:

*an* endless belt [means carried by rotatable members, said endless belt means including styli in the form of projecting pins and being formed] *of electrically conductive material having at least one stylus formed therein* from [selectively spaced,] *a* cut[,] and bent out, pointed [segments thereof] *segment of said material*;

an electrode disposed adjacent at least a portion of said endless belt [means] *and proximate said stylus, said electrode being spaced from said belt a distance sufficient to permit the contacting introduction of a sheet material between said electrode and said stylus*, said electrode including means responsive to a control signal for [causing] *permitting* an electric field to be effected between said electrode and said [styli] *stylus so as to develop in said sheet material an electrostatic charge pattern corresponding to said electric field*; and

[means for developing an electrostatic charge pattern corresponding to said electric field to produce a copy, said means being adapted to be moved orthogonal to an axis of rotation of said rotatable members and also being adapted to make contact with said electrode and at least one of said styli] *means for causing relative movement between said sheet material and said endless belt while maintaining one side of said sheet material in contact with said stylus and the other side of said sheet material in contact with said electrode.*

[2. The copier according to claim 1 wherein said endless belt means also includes timing means.]

3. The copier according to claim 1 wherein said electrode defines a plurality of segmented electrodes.

4. The copier according to claim 3 wherein said segmented electrodes each include means responsive to a control signal for selectively causing said electric field to be effected between each segmented electrode and said styli.

5. The copier according to claim 1 further comprising means for providing said control signal.

*6. The copier according to claim 1 wherein said electrode is elongate in configuration, and wherein said movement-causing means includes means for rotating said endless belt so as to cause said stylus to move along the length of said electrode and means for causing said sheet material to move across said electrode in a direction orthogonal to the direction of said stylus movement.*

*7. The copier according to claim 6 wherein said endless belt also includes timing means.*

*8. The copier according to claim 7 wherein said timing means includes a timing mark located adjacent said stylus, further comprising means for producing a timing signal representative of the presence of said mark and means responsive to said timing signal for producing said control signal.*

*9. The copier according to claim 8 wherein said timing mark comprises means defining an aperture formed in the material of said endless belt in spaced relationship with said stylus, and wherein said means for producing said timing signal includes a light-emitting element disposed on one side of said belt and a light-sensitive element disposed on the other side of said belt, such that the presence of said aperture means between said elements causes light from said light-emitting element to impinge upon said light-sensitive element and the absence of said aperture means causes said light to be blocked.*

*10. The copier according to claim 1 wherein said endless belt includes a plurality of said styli spaced around the length of said belt and wherein said electrode defines a plurality of electrode segments arranged along a line adjacent said belt, further including means for moving said belt in a manner causing each of said styli to traverse each of said electrode segments.*

*11. The copier according to claim 10 further comprising means responsive to the movement of said belt for producing said control signal, and wherein each said electrode segment includes means responsive to said control signal for selectively permitting an electric field to be effected between said segment and a respective one of said styli only during the time that said stylus is traversing said segment.*

*12. An electrographic copier comprising:*

*a plurality of styli mounted so as to be movable along a predetermined path;*

*an elongate electrode formed of a lesser plurality of electrically insulated electrode segments arranged along a line parallel to and adjacent said path of said styli such that each of said electrode segments is traversable by each of said styli, said electrode being spaced from said path a distance sufficient to permit the introduction of a sheet material between said styli and said electrode such that one surface of said material is in contact with at least one of said styli and the other surface of said material is in contact with each of said electrode segments; and*

*means responsive to a control signal for sequentially developing an electrical potential between one of said styli and each of said electrode segments so as to permit the production in a sheet material placed therebetween of an electrostatic charge pattern corresponding to said electrical potential.*

*13. The copier according to claim 12 wherein said plurality of styli comprises an endless belt of electrically conductive material having said styli formed therein from spaced, cut, and bent out, pointed segments of said material.*

*14. The copier according to claim 12 wherein said plurality of styli comprises a single helical conductor having a like plurality of turns extending along a longitudinal axis, each of said turns defining a respective one of said styli, and wherein said means for moving said styli includes means for causing said helical conductor to rotate about said axis in a manner causing each said turn to progress along said predetermined path and traverse each said electrode segment.*

*15. The copier according to claim 12 further comprising means for causing said sheet material to advance across said electrode in a direction normal to the path of said styli.*

*16. The copier according to each of claims 13 or 14 wherein said means for developing said electrical potential includes means for simultaneously developing a preselected electrical potential between each of a preselected plurality of said styli and a respective each of a like plurality of said electrode segments so as to permit the simultaneous production in said sheet material of a like plurality of individual charge patterns.*

*17. Stylus means in an electrographic copier for permitting the development of a charge pattern in a sheet material placed between said stylus means and a fixed electrode, said stylus means comprising an endless belt of electrically conductive material having at least one stylus formed therein from a cut and bent out, pointed segment of said material.*

*18. Stylus means according to claim 17 wherein said endless belt includes a plurality of said styli spaced around the length of said belt.*

* * * * *